United States Patent
Shuster et al.

(10) Patent No.: US 12,547,242 B2
(45) Date of Patent: Feb. 10, 2026

(54) IMMERSIVE DISPLAYS

(71) Applicant: UTHERVERSE DIGITAL INC., Vancouver (CA)

(72) Inventors: Brian Shuster, Vancouver (CA); Gary Stephen Shuster, Vancouver (CA)

(73) Assignee: UTHERVERSE DIGITAL INC., Vancouver (CA)

( * ) Notice: Subject to any disclaimer, the term of this patent is extended or adjusted under 35 U.S.C. 154(b) by 0 days.

(21) Appl. No.: 17/896,387

(22) Filed: Aug. 26, 2022

(65) Prior Publication Data
US 2023/0141039 A1    May 11, 2023

Related U.S. Application Data

(63) Continuation of application No. 16/735,505, filed on Jan. 6, 2020, now Pat. No. 11,455,032, which is a continuation of application No. 15/868,182, filed on Jan. 11, 2018, now Pat. No. 10,528,129, which is a continuation of application No. 14/677,519, filed on Apr. 2, 2015, now Pat. No. 9,977,495.

(60) Provisional application No. 62/052,975, filed on Sep. 19, 2014.

(51) Int. Cl.
*G06F 3/01* (2006.01)
*G02B 27/01* (2006.01)

(52) U.S. Cl.
CPC .............. *G06F 3/013* (2013.01); *G06F 3/011* (2013.01); *G06F 3/012* (2013.01); *G02B 2027/0141* (2013.01)

(58) Field of Classification Search
CPC .......... G06F 3/013; G06F 3/011; G06F 3/012; G02B 2027/0141
See application file for complete search history.

(56) References Cited

U.S. PATENT DOCUMENTS

| | | | | |
|---|---|---|---|---|
| 5,598,297 A * | 1/1997 | Yamanaka | ......... | G02B 27/0172 348/E13.041 |
| 5,850,352 A | 12/1998 | Moezzi et al. | | |
| 5,905,499 A | 5/1999 | McDowall et al. | | |
| 6,956,576 B1 * | 10/2005 | Deering | ................. | G06T 15/00 345/475 |

(Continued)

OTHER PUBLICATIONS

Kevin., "Mario Kart Double Dash VR Oculus Rift DEMO," YouTube Video dated Jan. 10, 2014. Retrieved from Internet:[https://www.youtube.com/watch?v=xSb194LbiTg].

(Continued)

*Primary Examiner* — Jitesh Patel
(74) *Attorney, Agent, or Firm* — Borden Ladner Gervais LLP; Geoffrey deKleine

(57) ABSTRACT

An immersive display includes a body, at least one display on the inside of the body for displaying images in front of at least one eye of a user, and a processor. The processor is coupled to the display and operable to obtain information utilized for displaying the images, identify a direction that a user is looking, identify a center of a field of view based on the direction that the user is looking, utilizing the information obtained, display a first portion of the images in a first area of the field of view and display a second portion of the images in a peripheral area of the field of view. The second portion of the images is displayed at one or both of a lower resolution and a lower refresh rate than the first portion of the images.

18 Claims, 3 Drawing Sheets

(56) References Cited

U.S. PATENT DOCUMENTS

| | | | |
|---|---|---|---|
| 9,035,878 B1 | 5/2015 | Wheeler | |
| 9,214,052 B2 | 12/2015 | Knee et al. | |
| 9,912,930 B2* | 3/2018 | Zustak | H04N 21/4728 |
| 9,977,495 B2 | 5/2018 | Shuster et al. | |
| 10,217,286 B1 | 2/2019 | Angel et al. | |
| 2004/0227703 A1* | 11/2004 | Lamvik | G09G 3/3233 |
| | | | 348/E5.145 |
| 2005/0134945 A1 | 6/2005 | Gallagher | |
| 2005/0234333 A1 | 10/2005 | Takemoto et al. | |
| 2008/0063384 A1 | 3/2008 | Tanaka et al. | |
| 2009/0325699 A1 | 12/2009 | Delgiannidis | |
| 2010/0149073 A1* | 6/2010 | Chaum | G02B 27/017 |
| | | | 345/8 |
| 2011/0241991 A1 | 10/2011 | Ogura et al. | |
| 2012/0027269 A1* | 2/2012 | Fidaleo | G09B 5/02 |
| | | | 382/118 |
| 2012/0113092 A1* | 5/2012 | Bar-Zeev | G06T 19/006 |
| | | | 345/419 |
| 2012/0146891 A1 | 6/2012 | Kalinli | |
| 2012/0154277 A1 | 6/2012 | Bar-Zeev et al. | |
| 2012/0163712 A1 | 6/2012 | Nakajima | |
| 2012/0281066 A1 | 11/2012 | Ohbitsu | |
| 2013/0050432 A1* | 2/2013 | Perez | G06F 3/011 |
| | | | 348/47 |
| 2013/0141419 A1 | 6/2013 | Mount et al. | |
| 2013/0194389 A1 | 8/2013 | Vaught et al. | |
| 2013/0250382 A1 | 9/2013 | Wiltshire et al. | |
| 2013/0300635 A1 | 11/2013 | White et al. | |
| 2013/0321406 A1 | 12/2013 | Harrold et al. | |
| 2014/0160129 A1 | 6/2014 | Sako et al. | |
| 2014/0184475 A1* | 7/2014 | Tantos | H04N 21/234318 |
| | | | 345/8 |
| 2014/0225814 A1 | 8/2014 | English et al. | |
| 2014/0285428 A1 | 9/2014 | Holz | |
| 2014/0361977 A1 | 12/2014 | Stafford et al. | |
| 2014/0375680 A1 | 12/2014 | Ackerman et al. | |
| 2015/0015666 A1 | 1/2015 | Kwon et al. | |
| 2015/0078621 A1 | 3/2015 | Choi et al. | |
| 2015/0154783 A1 | 6/2015 | Grundhofer et al. | |
| 2015/0215601 A1* | 7/2015 | Zhou | G06F 3/015 |
| | | | 348/43 |
| 2015/0243078 A1 | 8/2015 | Watson et al. | |
| 2015/0294504 A1 | 10/2015 | Daon | |
| 2016/0019830 A1 | 1/2016 | Schlangen | |
| 2018/0096533 A1 | 4/2018 | Osman | |

OTHER PUBLICATIONS

Snapshot of Oculus VR Forum Web Page, Jun. 2014, 1 page.
U.S. Appl. No. 14/677,519, Final Office Action dated Jul. 13, 2017.
U.S. Appl. No. 14/677,519, Non-Final Office Action dated Jul. 29, 2016.
U.S. Appl. No. 14/677,519, Notice of Allowance dated Jan. 26, 2018.
U.S. Appl. No. 15/868,182, Non-Final Office Action dated Apr. 19, 2019.
U.S. Appl. No. 15/868,182, Notice of Allowance dated Sep. 11, 2019.
U.S. Appl. No. 16/735,505, Advisory Action dated Jun. 18, 2021.
U.S. Appl. No. 16/735,505, Final Office Action dated Mar. 31, 2021.
U.S. Appl. No. 16/735,505, Final office Action dated Nov. 26, 2021.
U.S. Appl. No. 16/735,505, Non-Final Office Action dated Jun. 25, 2020.
U.S. Appl. No. 16/735,505, Notice of Allowance dated May 27, 2022.
U.S. Appl. No. 16/735,505, Non-Final Office Action dated Jul. 9, 2021.

* cited by examiner

IMMERSIVE DISPLAYS

FIELD OF TECHNOLOGY

The present disclosure relates to immersive displays such as three-dimensional (3D) displays for displaying virtual or augmented reality environments.

BACKGROUND

Immersive displays are becoming increasingly popular for the purpose of playing games in a virtual reality environment. These immersive displays may also be utilized for applications other than gaming, including, for example, augmented reality applications. The virtual world or augmented-reality is currently commonly perceived by the user based on two images, with each of the two images displayed close to a respective one of the user's eyes.

Such displays are often head-mounted and in many cases block out some or all of the real environment around the user in order to immerse the user, for example, in the virtual world. Thus, these displays may obstruct or block the user's vision of his or her surroundings. The virtual world or augmented-reality is perceived by the user based on images displayed very close to the user's eyes.

Improvements in immersive displays and applications or uses of such immersive displays are desirable.

SUMMARY

According to an aspect, an immersive display is provided. The immersive display includes a body, at least one display on the inside of the body for displaying images in front of at least one eye of a user, and a processor. The processor is coupled to the display and operable to obtain information utilized for displaying the images, identify a direction that a user is looking, identify a center of a field of view based on the direction that the user is looking, utilizing the information obtained, display a first portion of the images in a first area of the field of view and display a second portion of the images in a peripheral area of the field of view. The second portion of the images is displayed at one or both of a lower resolution and a lower refresh rate than the first portion of the images.

According to an aspect, an immersive display is provided. The immersive display includes a body, at least one display on the inside of the body for displaying images in front of at least one eye of a user, and a processor. The processor is coupled to the display and operable to obtain information utilized for displaying the images, identify a direction that a user is looking, identify a center of a field of view based on the direction that the user is looking, and utilizing the information obtained, display a first portion of the images in a first area of the field of view utilizing first display attributes and display a second portion of the images in a peripheral area of the field of view utilizing second display attributes that differ from the first display attributes.

According to still another aspect, a method of providing information for display on a display of an immersive display is provided. The method includes obtaining information utilized for displaying images in front of at least one eye of a user of the immersive display, identifying a direction that a user is looking, identifying a center of a field of view based on the direction that the user is looking, and utilizing the information obtained, display a first portion of the images in a first area of the field of view utilizing first display attributes and display a second portion of the images in a peripheral area of the field of view utilizing second display attributes that differ from the first display attributes.

BRIEF DESCRIPTION OF THE DRAWINGS

Embodiments of the present disclosure will now be described, by way of example only, with reference to the attached Figures, in which.

DETAILED DESCRIPTION

Figure 1:
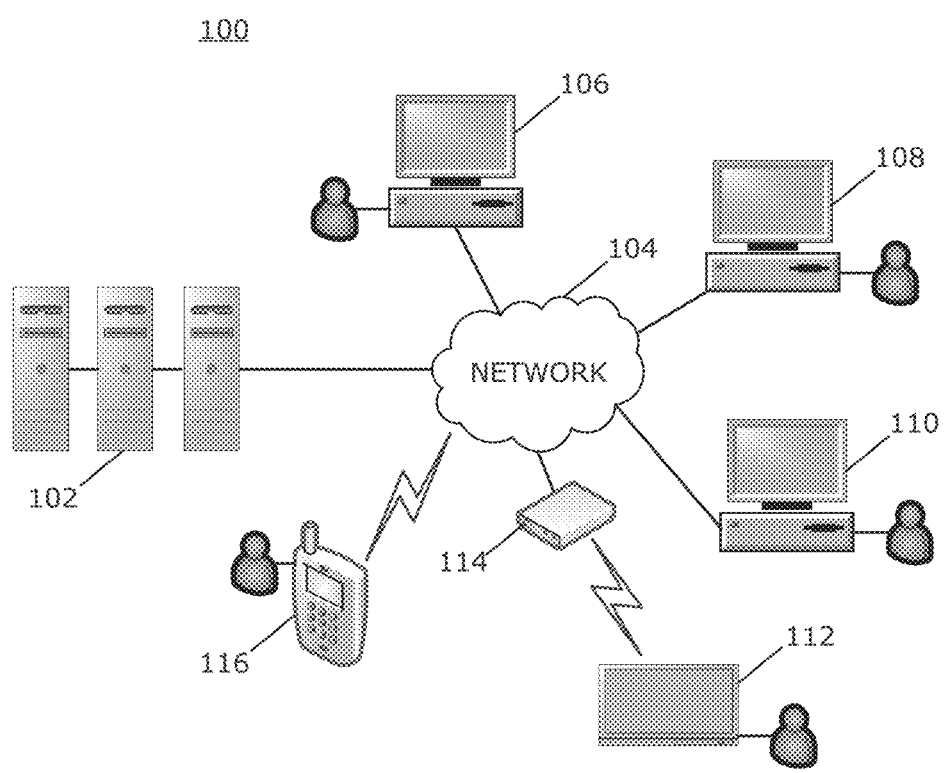
FIG. 1 is a system for providing a multi-user virtual event.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Because the display or displays of an immersive display may be very close to the user's eyes when the immersive display is worn by the user, the displays may render images and video in stereoscopic 3D to areas of the eyes that normally are presented with static non-stereoscopic 3D imagery, such as that part of a person's vision that normally sees the person's nose in one eye, and only monocular vision of the environment in that part of their field of view from the other eye. Presentation of stereoscopic 3D in areas not accustomed to seeing such imagery will very often cause motion sickness for the user wearing the display. Similarly, lack of the point of reference, which is removed when the nose and other normally static imagery that a person is accustomed to seeing in each separate eye is replaced with imagery from an immersive display, often causes the wearer to feel disoriented and also contributes to motion sickness. Additionally, a very high resolution, or large number of pixels, and a very high refresh rate is desirable in order to display images with sufficient clarity for virtual or augmented reality. Such high resolution and high refresh rate increases the demands on device resources such as processing power, memory, and bandwidth to transfer information to the immersive display.

The following describes an immersive display and a method of operating the immersive display. The method includes obtaining information utilized for displaying a first image in front of a first eye and a second image in front of a second eye of a user of the immersive display, excluding part of the information to yield adjusted information to occlude or replace first information from a first area of the first image and second information from a second area of a second image when displayed on the immersive display, and providing the adjusted information for displaying the first image absent the first area or in which a static image is displayed and the second image absent the second area or in which a static image is displayed on the immersive display. Thus, the display may replace the information for display in the first area with a static image to simulate, for example, a nose. Similarly, the display may replace the information for display in the second area with a static image to simulate, for example, a nose.

The following also describes a method of providing information for display on a display of an immersive display that includes obtaining information utilized for displaying a first image in front of a first eye and a second image in front of a second eye of a user of the immersive display, identifying a first area of the first image and a second area of the first image and identifying a third area of the second image and a fourth area of the second image, and displaying the first area of the first image and the third area of the second image utilizing first display attributes and displaying the second area of the first image and the fourth area of the second image utilizing second display attributes. The second display attributes differ from the first display attributes.

A system 100 for providing information for display on an immersive display is illustrated in FIG. 1. The system includes servers 102 that are coupled to a network 104 or networks, which includes the internet and may optionally include a cellular network through which several client devices, nodes, or terminals may be connected. In the example of FIG. 1, five client devices are coupled to the network 104, including desktop computers 106, 108, 110, a laptop computer 112 which is coupled to the network wirelessly through a modem 114, and a smartphone 116. The servers 102 store and execute software or firmware and communicate and cooperate with software and firmware on the client devices 106, 108, 110, 112, 116 via the network. The software and firmware on the client devices 106, 108, 110, 112, 116 also communicate and cooperate with software and firmware on respective immersive displays that may be worn by the users.

The servers 102, utilizing the software or firmware, provide the virtual environment, which may be a three-dimensional virtual environment. The environment may be any suitable environment for a game, a social network or interaction site, a meeting environment, such as a boardroom or meeting room, a classroom, a conference room or any other room or other scene. The virtual environment provided is dependent on the application and may be dependent on any other suitable factor such as the number of participants.

The servers 102 also manage authorization of users via client devices to facilitate participation in the virtual environment by avatars representing the users. The avatars enter the virtual environment to take part in or attend an event such as a game, a social network event or interaction, a meeting, class, conference or other event.

The images, including the environment, may be provided to the client devices 106, 108, 110, 112, 116 for display utilizing the immersive displays, which may be, for example, head-mounted displays worn by the users.

Figure 2:
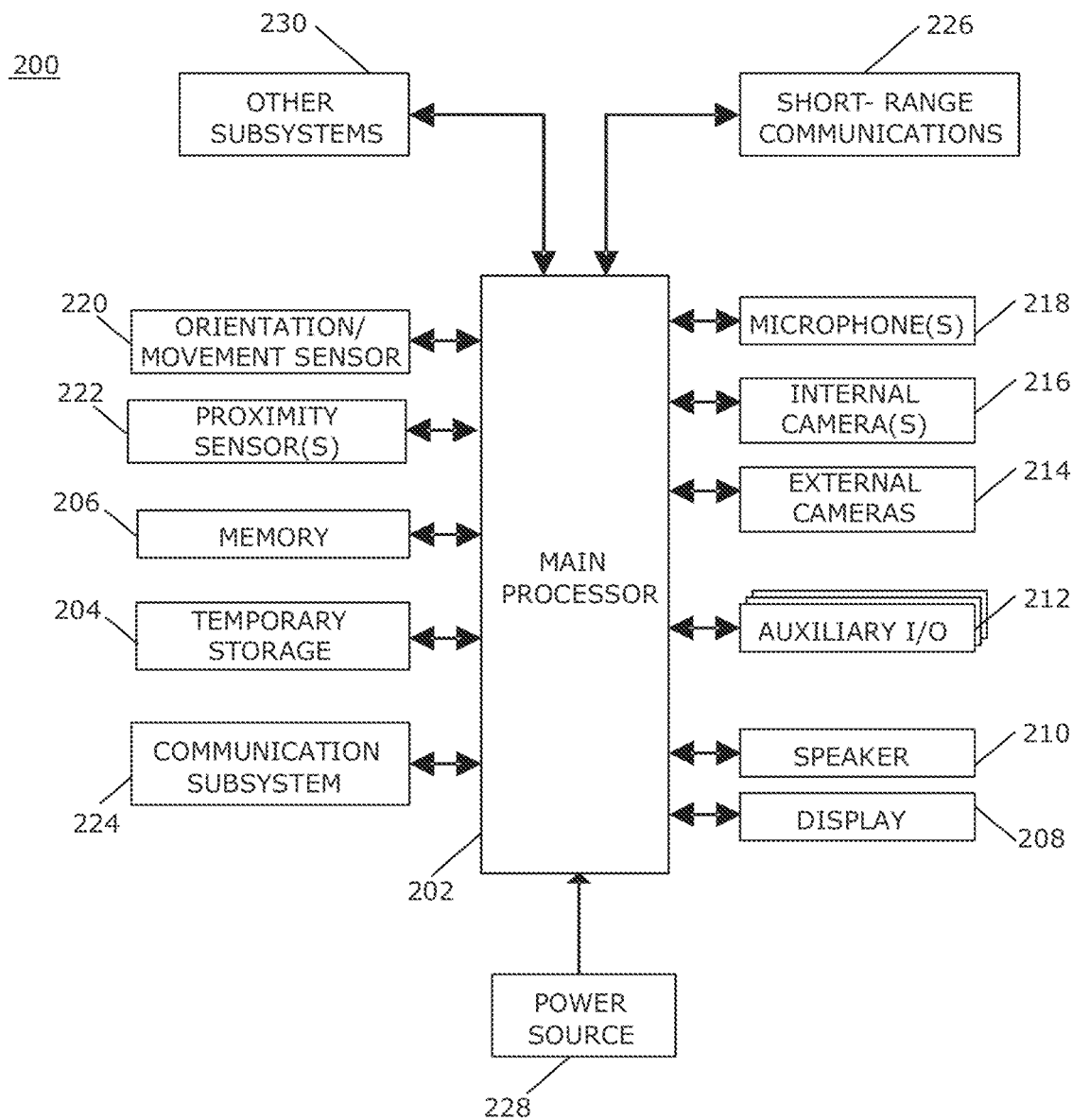
FIG. 2 is a simplified block diagram of an example of an immersive display of the system of FIG. 1.

A simplified block diagram of an example of an immersive display 200 is shown in FIG. 2. The immersive display 200 includes multiple components, such as a main processor 202 that controls the overall operation of the immersive display 200.

The main processor 202 interacts with other components of the immersive display 200, including, for example, a temporary storage device 204, a memory 206, a display device 208, a speaker 210, an auxiliary input/output (I/O) subsystem 212, external cameras 214, one or more internal cameras 216, one or more microphones 218, an orientation/movement sensor 220, one or more proximity sensors 222, a communication subsystem 224, short-range communications 226, a power source 228, and, optionally, other subsystems 230.

The temporary storage device 204 may be, for example, Random Access Memory (RAM) that stores data that is processed by the main processor 202. The memory 204, such as flash memory, is utilized for persistent storage.

The immersive display 200 provides video output through the display 208, which includes an interface, a controller and a pair of displays to display images. The images displayed include a respective image in front of each one of the user's eyes such that a right side image is displayed in front of a user's right eye and a left side image is displayed in front of a user's left eye. In addition to the display 208, output is provided via the speaker 210 or other audio output such as headphones or earphones. The auxiliary input/output (I/O) subsystem 212 includes an interface through which, for example, a USB controller or other peripheral device may be connected.

Input to the immersive display may be provided via external sensors or input devices such as the external cameras 214 mounted on the body of the immersive display 200. The external cameras 214 may include multiple cameras to obtain images extending around the user, i.e., 360° around the user. The external cameras 214 may also include cameras to obtain images in an upward direction from the user, and in a downward direction from the user. Each of the cameras includes the functional components for operation of the camera, including the lens, the image sensor, and, optionally, a light sensor and light source, such as infrared light emitting diodes (LEDs). Thus, the cameras provide images of the user's environment or surroundings. The cameras may be one or more of visual light cameras, 3D sensing cameras, light field cameras, forward looking infrared cameras, near infrared cameras, ultraviolet cameras, or other imaging devices.

The terms upward and downward are utilized herein to generally describe direction of view of the external cameras 214 relative to the user when the immersive display is worn by the user and the user is in an upright position, and such terms are not otherwise limiting.

The one or more internal cameras 216, referred to herein as the internal camera 216, may be mounted on an inside of the body of the immersive display and includes the functional components for operation of each internal camera, including the lens, the image sensor, and a light source, which may be a light source in the non-visible spectrum, such as infrared LEDs. Although the interior of the immersive display 200 may be dark because exterior light is blocked out or partially blocked out, the light source provides sufficient light for use of the internal camera 216.

The one or more microphones, referred to herein as the microphone 218, may also be mounted in the body of the immersive display 200 to provide input by converting audible information to electrical signals, which may be processed by the main processor 202 and may be transmitted to another electronic device to which the immersive display 200 is coupled. For example, the immersive display may be coupled to a smart-phone, a laptop computer, a tablet, a desktop computer, a game device, and any other suitable electronic device.

The main processor 202 also receives signals from the orientation/movement sensor 220, which is coupled to the body of the immersive display 200. The orientation/movement sensor may be, for example, an accelerometer, a gyro sensor, or any other suitable sensor or combination of sensors that is or are utilized to detect direction of movement, direction of gravitational forces, and reaction forces so as to determine, for example, the orientation of the immersive display 200 and the movement of the immersive display 200.

The one or more proximity sensors, referred to herein as the proximity sensors 222, may provide additional input to the main processor 202 to detect the presence of objects that are near or proximal to the sensor and thus to the user when the immersive display 200 is in use. The proximity sensors 222 may be any suitable proximity sensors such as a capacitive or photoelectric proximity sensor.

The communication subsystem 224 receives signals from another electronic device such as the client devices 106, 108, 110, 112, 116 shown in FIG. 1, and sends signals to the other electronic device to which the immersive display is coupled. Thus, for example, the signals from the microphone 218 or signals from the external cameras 216 or from the internal camera 216 may be sent via the communication subsystem 224. The communication subsystem 224 is also responsible for receiving signals from the other electronic device for processing by the main processor 202 to cause images, which may include video, to be displayed on the display 208 and for audio to be output through the speaker 210.

The immersive display 200 optionally includes short-range communications 226 to perform various communication functions. For example, the immersive display 200 may include Bluetooth or infrared (IR) communications capability, for example, for communicating with a peripheral device or accessory.

The power source 228 may be one or more rechargeable batteries or a port to an external power supply to power the immersive display 200.

The systems and subsystems that interact with the main processor 202 and are described herein are provided as examples only. Other subsystems 230 may also interact with the main processor 202.

Utilizing the images from the internal camera 216, the main processor 202 may be operable to track eye motion. To track eye motion, the user's pupils may be tracked when the immersive display 200 is in use. The eye motion tracking may also facilitate determination of what a user is looking at, for example, by triangulation to determine depth of an object or image that a user is looking at. Alternatively, the internal camera 216 may identify or track changes in muscles or muscle motion around at least one of the user's eyes to identify movement of the eye, or may track changes in shape of a lens of an eye or changes in shape of the lens of each eye to identify a focal distance, facilitating identification of the depth of focus of a user.

In one aspect, variable focal optical elements, such as the SuperFocus™ glasses may be utilized and controlled digitally to create a more realistic blur effect. Areas that are set to be blurred may be rendered with fewer pixels.

Based on the eye motion tracking, the direction that the user is looking may be identified. The direction may be, for example, an angle or angles, such as angular offset or offsets from straight ahead. Thus, when a user glances upwardly, downwardly, or to either side, the direction is identified and the images displayed utilizing the display 208 may be changed or adjusted based on the direction.

The main processor 202 is also operable to analyze the images from the internal camera to track or identify a change in facial expression. For example, the main processor 202 may utilize primary facial feature tracking by tracking features such as lips, nose, and eyes. Alternatively, or in addition, movement of parts of the face may be tracked. The main processor 202 may transmit facial expression data or an identification of the expression to the other electronic device to which the immersive display 200 is coupled via the communication subsystem 222.

The main processor 202 is also operable to receive the image data from the external cameras and to transmit the data to the other electronic device, along with metadata for at least key frames for identifying the image data such that the images can be stitched together to provide images of the user's surroundings. Thus, the images from each of the cameras can be stitched together to obtain images of the user's entire surroundings.

When viewing images without using the immersive display 200, a user's nose typically occludes part of the real space that is viewed. In other words, part of the real space cannot be seen without adjusting the direction or position of the head because the user's nose is in the line of sight or in the line of the peripheral vision. In virtual reality or augmented reality viewed through the immersive display, corresponding areas may be occluded from display. Areas that would correspond to a user's nose are not displayed to increase the user's perception that the virtual or augmented reality space is real. Thus, no image is displayed in the areas that would correspond to the location of a user's nose or a static image may be displayed. By providing no image or a static image in such areas, a stable reference is provided in the user's line of sight and the chance of experiencing motion sickness or the severity of the motion sickness experienced while wearing the immersive display 200 may be reduced.

In addition, because the display 208 of the immersive display 200 is very close to the user's eyes when the immersive display 200 is worn by the user, a very high resolution, or large number of pixels, and a very high refresh rate is desirable in order to display images with sufficient clarity for virtual or augmented reality. Such high resolution and high refresh rate utilizes more processing power. Replacing parts of the images with static images to simulate a nose reduces the number of pixels for which information is processed for display, thus reducing one or more of processing requirements, memory requirements, and bandwidth utilized to transfer information to the immersive display.

Figure 3:
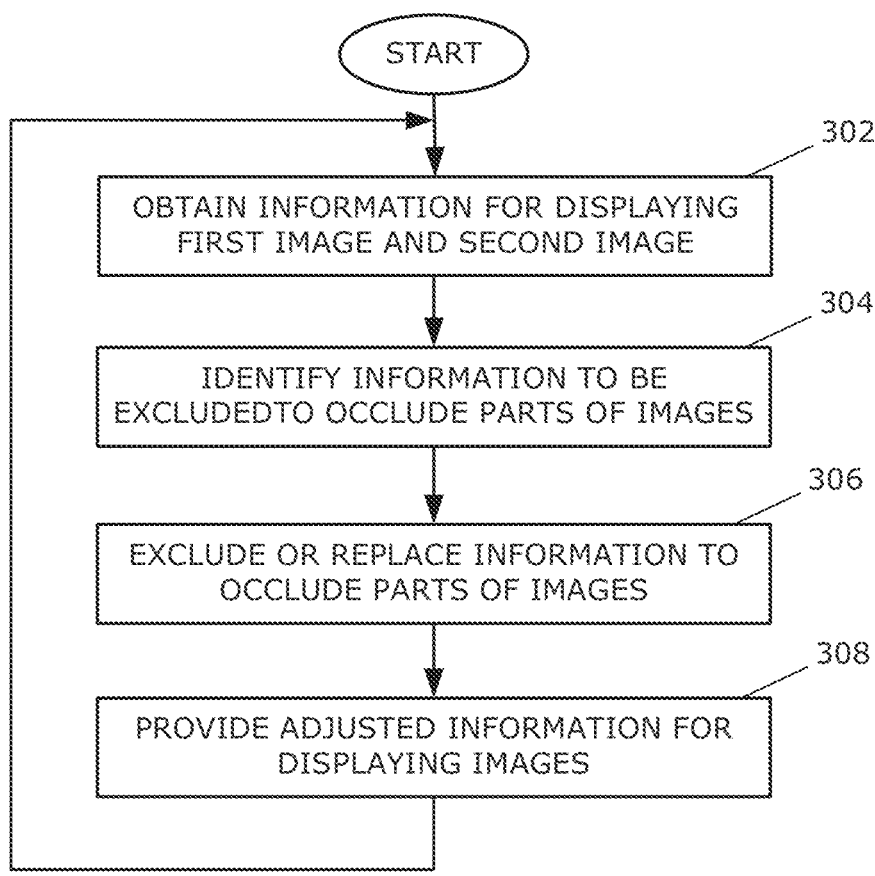
FIG. 3 is a flowchart illustrating an example of a method of providing information for display on an immersive display.

A flowchart illustrating a method of providing information for display on a display of an immersive display is shown in FIG. 3. The method may be carried out by software executed, for example, by one or more of the servers 102, by one or more of the client devices 106, 108, 110, 112, 116, by the main processor 202 of the immersive display 200, or by a combination of these devices. Coding of software for carrying out such a method is within the scope of a person of ordinary skill in the art given the present description. The method may contain additional or fewer processes than shown and/or described, and may be performed in a different order. Computer-readable code executable by at least one processor to perform the method may be stored in a computer-readable medium, such as a non-transitory computer-readable medium.

Information is obtained for displaying on the display 208 of the immersive display 200 at 302. The information includes information for displaying a right side image in front of a right eye and a left side image in front of a left eye of a user of the immersive display 200 to provide a virtual 3-D image for the user. The information may be information from an application and is utilized to display a scene from a game, a social network or interaction site, a meeting environment, such as a boardroom or meeting room, a classroom, a conference room or any other room or other scene.

Parts of the information are identified for exclusion from the information or for replacement with a static image at 304. The parts of the information that are identified correspond to a first area of the right side image and a second area of the left side image. The first area and the second area correspond to areas at which a user's nose would occlude the field of vision in real space. Thus, the first area is at a left side of the right side image and the second area is at a right side of the left side image.

Other parts of the information that correspond to other areas may also be identified for exclusion or for replacement with static images. For example, in addition to the areas that correspond to the user's nose, other areas that correspond to typical locations of cheekbones or eye sockets or both may be occluded from the field of vision. The information that corresponds to these areas of each of the right side image and the left side image may also be identified for exclusion, which may further increase the perception that the virtual reality space or augmented reality space is real.

The parts of the information are removed from the information obtained to yield adjusted information at 306. The adjusted information includes less information or data than the information obtained at 302, prior to removing the identified information. Alternatively, the parts of the information are replaced with static images to simulate a user's nose. The static images may be displayed at a lower resolution and may be displayed at a slower refresh rate.

The adjusted information is then provided at 308 for displaying the first image without the first area and the second image without the second area, corresponding to the areas at which the user's nose is present. The static images may be displayed in the first area and the second area.

The method illustrated in FIG. 3 is continuous such that the images are continuously updated on the display 208 of the immersive display 200 to display or play virtual reality or augmented reality video on the immersive display 200.

By providing no image or a static image in the areas that correspond to the nose or other occluded areas, the amount of information that is required for displaying images on the display 208 is reduced. The amount of information required for rendering is reduced. Thus, the area of the display 208 on which information is rendered is reduced. The display 208 may also or alternatively be reduced in size, such that the display 208 does not extend to those areas at which information is not rendered. Alternatively, the display resolution may be reduced for such areas, for example, for rendering a static image. In one example, the amount of information transmitted from the one or more servers 102 may be reduced.

As indicated above, the method illustrated in FIG. 3 and described above may be carried out by software executed, for example, by one or more of the servers 102, by one or more of the client devices 106, 108, 110, 112, 116, by the main processor 202 of the immersive display 200, or by a combination of these devices.

Optionally, the static image that is displayed on occluded areas of the display may be customizable or configurable by the user. For example, the static image may be configured by the user to configure attributes of the image, such as size, shape, and skin tone of the static image, to simulate the user's nose. For example, such configuring may be carried out by selection of options from a menu or utilizing any other suitable method.

According to one example, the method is carried out at one or more of the servers 102 such that the server obtains the information from an application executed at the one or more servers 102 at 302. The one or more servers 102 also identifies the parts of the information for exclusion, including the first area of the right side image and the second area of the left side image at 304 and the one or more servers 102 removes the information at 306 to yield adjusted information that excludes the identified information. The adjusted information is provided by the one or more servers 102 at 308, to the immersive display 200 by sending the adjusted information to the immersive display 200, via the respective client device.

According to another example, the method is carried out at the client device 106, 108, 110, 112, 116. In this example, the client device obtains the information from the one or more servers 102 or from the immersive display 200, for example, from images captured utilizing the external camera or cameras 216 of the immersive display 200 at 302. The client device 106, 108, 110, 112, 116 identifies the parts of the information for exclusion, including the first area of the right side image and the second area of the left side image at 304 and the client device 106, 108, 110, 112, 116 removes the information at 306 to yield adjusted information that excludes the identified information. The adjusted information is provided by the client device 106, 108, 110, 112, 116, to the immersive display 200 by sending the adjusted information to the immersive display 200 for displaying, on the display 208, the right side image excluding at least the first area and the left side image excluding at least the second area.

According to yet another example, the method is carried out at the immersive display 200. According to this example, the main processor 202 of the immersive display 200 obtains the information from the respective client device 106, 108, 110, 112, 116, or from the one or more servers 102 via the respective client device 106, 108, 110, 112, 116, or, for example, from images captured utilizing the external camera or cameras 216 of the immersive display 200 at 302. The processor 202 identifies the parts of the information for exclusion, including the first area of the right side image and the second area of the left side image at 304 and the processor 102 removes the information at 306 to yield adjusted information that excludes the identified information. The adjusted information is provided by the processor 102, to the display 208 of the immersive display 200 by sending the adjusted information to the immersive display 200 for displaying the right side image excluding at least the first area and the left side image excluding at least the second area.

As described above, the images displayed, utilizing the pair of displays, include a respective image in front of each one of the user's eyes such that a right side image is displayed in front of a user's right eye and a left side image is displayed in front of a user's left eye. Rather than utilizing generally symmetrical circular, rectangular or simple geometric shaped displays designed to maximize display of potentially viewable areas to all areas of each eye of the user, the immersive display may be constructed with displays that are shaped to only display environmental imagery to those areas of each eye that typically see such imagery in the normal course of use. For example, each display may be generally circular with the exception of a notch or area corresponding to a user's nose. Thus, each display is shaped to occlude an area to correspond with the user's nose. The displays may also be shaped to occlude areas corresponding to other facial features such as eye sockets and cheekbones.

Such shaped displays may be advantageous because areas of images are occluded by the shape of each display rather than by software, reducing processing time. Additionally, by reducing the total area of each display compared to a geometrically simple display, the total number of pixels of the display may be reduced compared to a circular display, for example, while still displaying images at the same very high resolution.

Optionally, an obstruction may be inserted into the body to cooperate with the body to simulate the nose. The obstruction may cooperate with the body of the immersive display 200 such that the obstruction is mechanically retained in the immersive display.

According to another alternative, the body of the immersive display 200 may be configured to receive obstructions to occlude areas of the display. In this example, a first obstruction is insertable into the body to cooperate with the body to occlude a first area of the first image and a second obstruction is insertable into the body to cooperate with the body to occlude a second area of the second image. The first obstruction and the second obstruction are sized and shaped to simulate a user's nose when inserted into the display to occlude the areas of the display.

Figure 4:
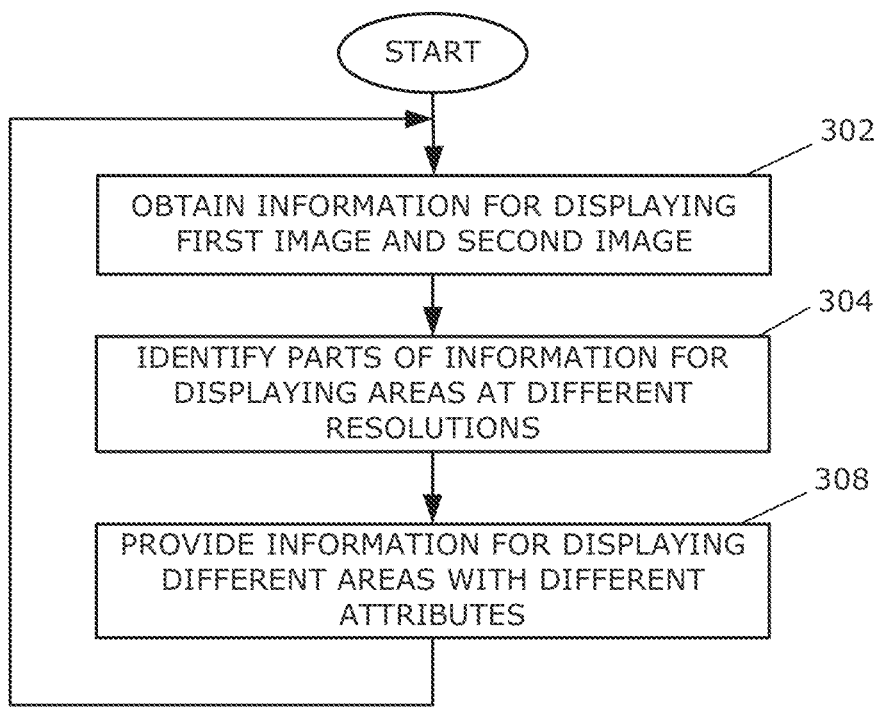
FIG. 4 is a flowchart illustrating an example of another method of providing information for display on an immersive display.

A flowchart illustrating another method of providing information for display on a display of an immersive display is shown in FIG. 4. The method may be carried out by software executed, for example, by the one or more of the client devices 106, 108, 110, 112, 116, or by the main processor 202 of the immersive display 200, or by a combination of these devices. Coding of software for carrying out such a method is within the scope of a person of ordinary skill in the art given the present description. The method may contain additional or fewer processes than shown and/or described, and may be performed in a different order. Computer-readable code executable by at least one processor to perform the method may be stored in a computer-readable medium, such as a non-transitory computer-readable medium.

When viewing images utilizing the immersive display 200, a high definition image in the center of the field of view of the user provides a sharper and more realistic image for an improved experience or more realistic experience than a lower definition image. Peripheral areas of vision, however, may be rendered at lower definition or slightly out of focus. In fact, corrective lens eyeglasses generally correct for vision in an area centered on the field of view, for example, in a circle directly in front of the eye. Outside of this area, the eyeglasses may not correct for vision or correction may be reduced such that the areas outside the center of the field of view are out of focus or blurred for the user. Similarly, sunglasses generally reduce the amount of sunlight coming into an area in front of each eye of the user. However, the sunlight may still enter the eye from other areas in the user's peripheral vision, around the sunglasses and thus, these other areas may appear overexposed. Thus, information outside of the area at the center of the field of view, also referred to as the peripheral area, may be displayed at a lower resolution than the information in the area at the center of the field of view, or at a lower refresh rate.

Information is obtained for displaying on the display 208 of the immersive display 200 at 402. The information includes information or data that is utilized by the display 208 to display the images. The information includes information for displaying the right side image in front of a right eye and the left side image in front of a left eye of a user of the immersive display 200 to provide a virtual 3-D image for the user. The information may be information from an application and is utilized to display a scene from a game, a social network or interaction site, a meeting environment, such as a boardroom or meeting room, a classroom, a conference room or any other room or other scene.

Parts of the information utilized to display the images are identified at 404 for displaying different areas at different resolution. Part of the information utilized for displaying the right side image is identified for displaying a peripheral area of the image at a lower resolution compared to the remainder of the image. Part of the information utilized for displaying the right side image is identified for displaying a peripheral area of the image at a lower resolution compared to the remainder of the image. For example, information utilized to display any area that is outside a circular or elliptical area at the center of the field of vision may be identified as the peripheral area. Information utilized to display the peripheral area of the right side image and information utilized to display the peripheral area of the left side image may be identified.

To identify the part of the information utilized to display the areas of the image that are outside the area at the center of the field of view, the information utilized to display the area of the image at the center of the field of view in each of the right side image and the left side image may alternatively be identified, thus distinguishing between the information utilized to display the area of the image that is at the center of the field of view and the information that is utilized to display the areas that are outside the center of the field of view.

Optionally, the images from the internal camera 216 of the immersive display 200 may be utilized by the main processor 202 to track one or each of the user's pupils to identify the direction that the user is looking. The field of view may be identified based on the direction that the user is looking. For example, for each of the right side image and the left side image, an area at the center of a field of view may be identified by a circular or elliptical area centered on the direction that the user is looking. The information that is utilized to display the area at the center of the field of view is identified, thus distinguishing between the information utilized to display the area of the image that is at the center of the field of view and the information that is utilized to display the areas that are outside the area at the center of the field of view.

Alternatively or additionally, the internal camera 216 may identify or track changes in muscles or muscle motion around at least one of the user's eyes to identify movement of the eye, or may track changes in shape of a lens of an eye or changes in shape of the lens of each eye to identify a focal distance, facilitating identification of direction and depth of focus of a user. The center of the field of view of each of the right side image and the left side image may be based on such tracking and the size of the area that is identified as the center of the field of view may also vary based on such tracking. For example, a smaller center of the field of view may be identified when the depth of focus is greater as a user is viewing an object perceived to be a greater distance away.

According to an alternative embodiment, information that is utilized to display the area at the center of the field of view may be obtained and the information utilized to display parts of the image in the peripheral area may be created. For example, the information utilized to display the pixels in the peripheral area around the area at the center of the field of view may be created at the respective client device or at the immersive display 200. The information may be created based on attributes of the displayed image in the area at the center of the field of view. Thus, the information to display the area at the center of the field of view is received at the respective client device and immersive display 200 and the information to display the peripheral area is created.

Information is provided to the display 208 of the immersive display 200 for displaying different areas utilizing different attributes at 406. For example, the right side image and the left side image are provided to the display 208 for displaying at 406. The area of the right side image that is at the center of the field of view is displayed utilizing first display attributes. The peripheral area of the right side image, outside the area at the center of the field of view, is displayed utilizing second display attributes. Similarly, the area of the left side image that is at the center of the field of view is displayed utilizing first display attributes and the peripheral area of the left side image, outside the center of the field of view, is displayed utilizing a second display attribute.

For example, the areas outside each area at the center of the field of view in each of the left side image and the right side image may be displayed at a lower resolution and with a lower refresh rate than each respective area at the centers of the field of view.

A plurality of parts of the information may be identified at 404 for each image. For example, information to display the area at the center of the field of vision may be identified. Information to display an intermediate area surrounding the area at the center of the field of vision may be identified and information to display an outer peripheral area may be identified. The information may be identified to display the area at the center of the field of vision at the highest resolution while displaying the intermediate area at a relatively lower, intermediate resolution, and displaying the outer peripheral area at a resolution that is lower than the intermediate area. In this example, three areas are identified in each of the right side image and the left side image and each of the areas are displayed utilizing different attributes. Other areas may be identified for displaying utilizing different attributes.

The method illustrated in FIG. 4 is continuous such that the images are continuously updated on the display 208 of the immersive display 200 to display or play virtual reality or augmented reality video on the immersive display 200.

In addition or alternatively, the immersive display 200 may include adjustable corrective lenses positioned to be located in front of the user's eyes when the immersive display is worn by a user. The adjustable corrective lenses are utilized to adjustably correct the user's vision while the areas of the images that fall outside the lenses remain unadjusted and therefore blurred to the user who would otherwise wear corrective lens eyeglasses.

In one aspect, where resolution, processing power, and/or other elements are insufficient to render a full field, simulated obstructive objects may be placed in the field. For example, in a concert, a person sitting in front of the user may don a large virtual "hat" to obstruct the user's view and reduce the area of the display for which the image must be rendered.

The described embodiments are to be considered as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. An immersive display comprising:
a body;
at least one display on the inside of the body for displaying images in front of at least one eye of a user;
a processor coupled to the display and operable to:
track changes in a shape of a lens of the at least one eye of the user;
utilizing the changes in the shape of the lens, identify both (i) a direction that a user is looking and (ii) a focal distance to determine a depth of focus of the user;
identify a center of a field of view based on the direction that the user is looking, and determine a size of the center of the field of view by applying a sizing rule parameterized by the focal distance and apply the determined size at the identified direction such that:
(i) a change in the tracked lens-shape that alters the focal distance causes the size of the center of the field of view to be updated according to the sizing rule; and
(ii) a change in the tracked lens-shape that alters the direction causes the center of the field of view, having the determined size, to be re-centered at the updated direction;
obtain information utilized to display a first portion of the images in the center of the field of view;
utilizing the information obtained, display the first portion of the images in the center of the field of view;
based on the first portion of the images, create and display a second portion of the images in a peripheral area of the field of view, wherein the second portion of the images is displayed at one or both of a lower resolution and a lower refresh rate than the first portion of the images.

2. The immersive display of claim 1, wherein the second portion of the images is displayed at the lower resolution than the first portion of the images.

3. The immersive display of claim 1, wherein the second portion of the images is displayed at the lower refresh rate than the first portion of the images.

4. The immersive display of claim 1, wherein the second portion of the images is displayed at the lower resolution and at the lower refresh rate than the first portion of the images.

5. The immersive display of claim 1, wherein the focal distance is identified based on measurements of the lens of the eye.

6. The immersive display of claim 1, wherein the processor is operable to display on the display, a third portion of the images in a third area of the field of view, and wherein the third portion of the images is displayed at a different resolution than the first portion of the images and the second portion of the images.

7. The immersive display of claim 1, wherein identifying the direction that the user is looking is performed without tracking a position of a pupil of the user and without using a pupil-based eye-tracking signal.

8. An immersive display comprising:
a body;
at least one display on the inside of the body for displaying images in front of at least one eye of a user;
a processor coupled to the display and operable to:
track changes in a shape of a lens of the at least one eye of the user;
utilizing the changes in the shape of the lens, identify both (i) a direction that a user is looking and (ii) a focal distance to determine a depth of focus of the user;

identify a center of a field of view based on the direction that the user is looking, and determine a size of the center of the field of view by applying a sizing rule parameterized by the focal distance and apply the determined size at the identified direction such that:
  (i) a change in the tracked lens-shape that alters the focal distance causes the size of the center of the field of view to be updated according to the sizing rule; and
  (ii) a change in the tracked lens-shape that alters the direction causes the center of the field of view, having the determined size, to be re-centered at the updated direction;
obtain information utilized to display a first portion of the images in the center of the field of view;
utilizing the information obtained, display the first portion of the images in the center of the field of view utilizing first display attributes;
based on the first portion of the images, create and display a second portion of the images in a peripheral area of the field of view utilizing second display attributes that differ from the first display attributes.

9. The immersive display according to claim 8, wherein the first display attributes comprise a first resolution, the second display attributes comprise a second resolution, and wherein the second resolution is lower than the first resolution.

10. The immersive display according to claim 8, wherein the first display attributes comprise a first refresh rate and the second display attributes comprise a second refresh rate, and wherein the second refresh rate is lower than the first refresh rate.

11. The immersive display according to claim 8, wherein the processor is coupled to the display and operable to display a third portion of the images in a third area of the field of view utilizing third display attributes that differ from the first display attributes and the second display attributes.

12. The immersive display according to claim 11, wherein the second area is intermediate the first area and the third area.

13. The immersive display according to claim 12, wherein the third area comprises an outer peripheral area of the field of view.

14. The immersive display of claim 8, wherein identifying the direction that the user is looking is performed without tracking a position of a pupil of the user and without using a pupil-based eye-tracking signal.

15. A method of providing information for display on a display of an immersive display, the method comprising:
  tracking changes in a shape of a lens of the at least one eye of the user;
  utilizing the changes in the shape of the lens, identifying both (i) a direction that a user is looking and (ii) a focal distance to determine a depth of focus of the user;
  identifying a center of a field of view based on the direction that the user is looking, and determining a size of the center of the field of view by applying a sizing rule parameterized by the focal distance and apply the determined size at the identified direction such that:
    (i) a change in the tracked lens-shape that alters the focal distance causes the size of the center of the field of view to be updated according to the sizing rule; and
    (ii) a change in the tracked lens-shape that alters the direction causes the center of the field of view, having the determined size, to be re-centered at the updated direction;
  obtaining information utilized to display a first portion of images in the center of the field of view;
  utilizing the information obtained, displaying the first portion of the images in the center of the field of view utilizing first display attributes; and
  based on the first portion of the images, creating and displaying a second portion of the images in a peripheral area of the field of view utilizing second display attributes that differ from the first display attributes.

16. The method according to claim 15, wherein the first display attributes comprise a first resolution, the second display attributes comprise a second resolution, and wherein the second resolution is lower than the first resolution.

17. The method according to claim 15, wherein the first display attributes comprise a first refresh rate and the second display attributes comprise a second refresh rate, and wherein the second refresh rate is lower than the first refresh rate.

18. The method of claim 15, wherein identifying the direction that the user is looking is performed without tracking a position of a pupil of the user and without using a pupil-based eye-tracking signal.

* * * * *